(12) United States Patent
Wu et al.

(10) Patent No.: US 8,389,665 B2
(45) Date of Patent: Mar. 5, 2013

(54) METHOD FOR PREPARING TERPOLYMER OF POLY (BIPHENYL SULFONE ETHER) AND POLY (ETHER SULFONE)

(75) Inventors: Zhongwen Wu, Guangzhou (CN); Rongtang Ma, Guangzhou (CN)

(73) Assignee: Kingfa Sci & Tech Co., LTd., Guangzhou (CN)

( * ) Notice: Subject to any disclaimer, the term of this patent is extended or adjusted under 35 U.S.C. 154(b) by 0 days.

(21) Appl. No.: 13/501,356

(22) PCT Filed: Oct. 26, 2010

(86) PCT No.: PCT/CN2010/001699
§ 371 (c)(1),
(2), (4) Date: Apr. 11, 2012

(87) PCT Pub. No.: WO2011/050572
PCT Pub. Date: May 5, 2011

(65) Prior Publication Data
US 2012/0202967 A1    Aug. 9, 2012

(30) Foreign Application Priority Data
Oct. 27, 2009   (CN) .......................... 2009 1 0217764

(51) Int. Cl.
*C08G 64/00*   (2006.01)
*C08G 63/02*   (2006.01)
(52) U.S. Cl. .................... 528/196; 528/198; 528/219
(58) Field of Classification Search .................. 528/196, 528/198, 219
See application file for complete search history.

(56) References Cited

U.S. PATENT DOCUMENTS
3,634,355 A   1/1972   Barr et al.

FOREIGN PATENT DOCUMENTS

| CN | 1765953 A | 5/2006 |
| CN | 1844196 A | 10/2006 |
| CN | 101704951 | 5/2010 |
| GB | 1153528 A | 5/1969 |
| WO | 8604905 A | 8/1986 |
| WO | 8604906 A | 8/1986 |

OTHER PUBLICATIONS

Antonino Mamo, Amino terminated copoly(ethersulphone)s bearing biphenylenic units in the backbone: Synthesis and characterization, Polymer, Jun. 24, 2010, vol. 51, No. 14, pp. 2972-2983.
Concetto Puglisi, Combined MALDI—TOF MS and NMR characterization of copoly(arylen ether sulphone)s, Polymer, 2006, vol. 47, pp. 1861-1874.
C. Maes, Characterization of Novel Modified Amorphous Poly (Ether Sulphone)s, Journal of Polymer Science: Part A: Polymer Chemistry, 1994, vol. 32, pp. 3171-3182.

*Primary Examiner* — Terressa Boykin
(74) *Attorney, Agent, or Firm* — Lucas & Mercanti, LLP; Peter J. Phillips

(57) ABSTRACT

A method for preparing terpolymer of poly (biphenyl sulfone ether) and poly (ether sulfone) comprises: adding high-temperature organic solvent into a flask, stirring and heating to 80° C., adding 4,4'-dichlorodiphenylsulfone, 4,4'-Bis(4-chlorophenyl)sulfonyl-1,1'-biphenyl and 4,4'-dihydroxydiphenylsulfone with solid content of 20-35%; stirring until monomers are completely dissolved, heating to 100° C., adding salt-forming agent and xylene; stirring while heating so that salt-forming reaction begins in the system, wherein the system temperature is controlled between 190° C. and 210° C.; when the amount of water discharged reaches the theoretical value, the first stage of salt-forming reaction is finished; heating the system to 230-236° C., and maintaining for 3-4 hours to obtain polymer viscous liquid; and refining the polymer viscous liquid to obtain a terpolymer containing different structural units in the molecular chain, wherein the Tg of the terpolymer can be regulated by changing the ratio of the two dichloro-containing monomers.

8 Claims, 1 Drawing Sheet

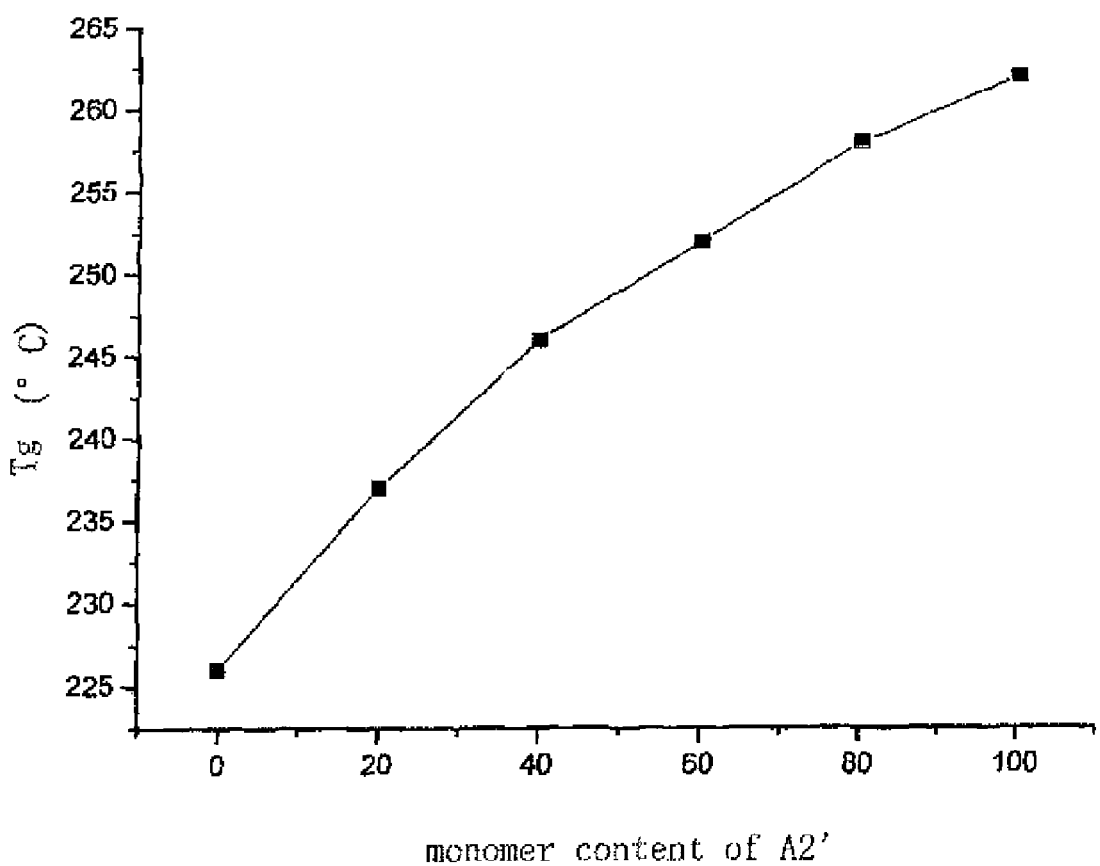

METHOD FOR PREPARING TERPOLYMER OF POLY (BIPHENYL SULFONE ETHER) AND POLY (ETHER SULFONE)

FIELD OF THE INVENTION

The present invention falls into the art of high-molecular materials, and in particular relates to a method for preparing series of terpolymer of poly (biphenyl sulfone ether) and poly (ether sulfone) in a set of production equipment using ternary polymerization technology.

BACKGROUND OF THE INVENTION

Poly (ether sulfone) is a special engineering plastic with exceptional comprehensive physical properties. Due to its comprehensive heat resistance (heat distortion temperature 200-220° C.), hydrolysis resistance (withstanding 150-160° C. hot water or vapor), creep resistance, dimensional stability, impact resistance, chemical resistance, non-toxicity, flame retardance, etc., it has been widely applied to such fields as electrics, electronics, machinery, automobile, hot water, medical apparatus and food processing. Its global production capacity has reached tens of thousands of tons, represented by Solvay Chemicals, Inc. However, over long-term application and extension, higher heat resistance requirements are being raised in different fields of application. In other words, there is a prevalent expectation for increasing its heat resistance grade from today's H to C while keeping its mechanical properties unchanged. It is driven by this market demand that we have completed the study of copolymers containing the diphenyl sulfone ether structure with a higher heat resistance grade, and created this patent on the basis of existing polysulfone patents, such as ZL200510017259.8, by first synthesizing monomers containing the diphenyl sulfone structure successfully using the principle of molecular design and ternary polymerization technology.

SUMMARY OF THE INVENTION

The essence of the present invention is to add the following to the reaction system in the presence of heat resistant organic solvent:

(1)

$A_2$ 4,4'-dichlorodiphenylsulfone (2)

$A_2'$ 4,4'-Bis(4-chlorophenyl)sulfonyl-1,1'-biphenyl (3)

$B_2$ 4,4'-dihydroxydiphenylsulfone

When the three monomers and the alkali carbonate salt-forming agent $M_2CO_3$ are mixed, a terpolymer whose molecular chain contains the following repeated unit structures can be obtained through a certain temperature rise procedure and after a certain hold time:

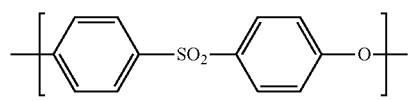

chain segment I i.e., $A_2B_2$

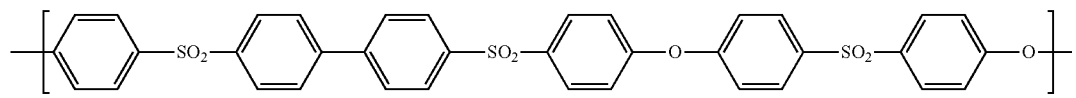

chain segment II i.e., $A_2'B_2$

The method is implemented by adding high-temperature organic solvent to a three-neck flask provided with a thermometer, a nitrogen tube, a condensate water separator and a stirrer, heating to 80° C. and adding 4,4'-dichlorodiphenylsulfone, 4,4'-Bis(4-chlorophenyl)sulfonyl-1,1'-biphenyl and 4,4'-dihydroxydiphenylsulfone with solid content being 20-35%, stirring until all monomers are dissolved, heating to 100° C. and adding alkali carbonate salt-forming agent mol % more than 4,4'-dihydroxydiphenylsulfone by 5-10%, and 60-100 ml of xylene per mole of polymer; heating while stirring so that the salt-forming reaction of the system begins, wherein the system temperature is controlled between 190° C. and 210° C., and the theoretical value achievement of water yield of the system represents the completion of the first-stage salt-forming reaction; at the moment, raising the system temperature to 230-236° C. and maintaining for 3-4 hours to complete polymerization to obtain a viscous polymer solution;

After the reaction stops, injecting the viscous polymer solution directly into distilled water at room temperature to obtain a strip solid; grinding the strip solid into powder in a tissue grinder in the presence of water to obtain a solid powder containing a polymer, water-soluble solvent and salt through filtration; adding the solid powder to deionized water, boiling away for 1 hour, and removing the water-soluble solvent and salt through filtration; then boiling away the polymer-containing solid powder in the same way 8-10 times until the chloride ion content in the boiling filtrate as detected with silver nitrate is acceptable; and vacuum drying the resultant polymer powder until the moisture content by weight is less than 0.5%, when a terpolymer containing chain segments I and II is obtained.

Further, when the mixing ratio (namely mole number ratio) of the above three monomers is:

(1) $A_2:A'_2 \geqq 99\%:1\%$, where the mole consumption of $B_2$ is the sum of the mole numbers of $A_2$ and $A'_2$, the content of chain segment I is $\geqq 99\%$ and that of chain segment II $\leqq 1\%$ in the resultant terpolymer, and the macroscopic physical properties of the terpolymer are the same as those of the corresponding poly (ether sulfone) (PES).

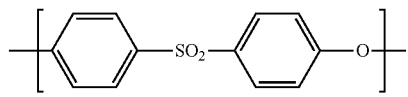

(2) $A_2:A'_2 \leqq 1\%:99\%$, where the mole consumption of $B_2$ is the sum of the mole numbers of $A_2$ and $A'_2$, the content of chain segment II is $\geqq 99\%$ and that of chain segment I $\leqq 1\%$ in the resultant terpolymer, and the macroscopic physical properties of the terpolymer are equivalent to those of the corresponding poly (biphenyl sulfone ether).

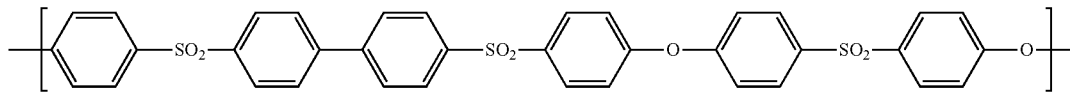

When the sum of the consumptions of 4,4'-dichlorodiphenylsulfone and 4,4'-Bis(4-chlorophenyl)sulfonyl-1,1'-biphenyl is more than that of 4,4'-dihydroxydiphenylsulfone, a chlorine end group with the following structure will be obtained:

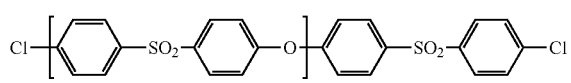

which can be used as an engineering plastic due to its good thermal stability.

When 4,4'-dihydroxydiphenylsulfone is more than the sum of the consumptions of 4,4'-dichlorodiphenylsulfone and 4,4'-Bis(4-chlorophenyl)sulfonyl-1,1'-biphenyl, a hydroxyl end group with the following structure may be obtained:

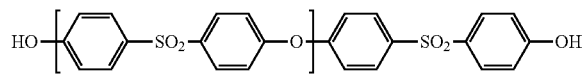

which can be used as paint.

A terpolymer with a different ratio of chain segment I to chain segment II in the molecular chain, and a different structural composition can be obtained by changing the mixing ratio of the two Bi-chloride monomers (4,4'-dichlorodiphenylsulfone and 4,4'-Bis(4-chlorophenyl)sulfonyl-1,1'-biphenyl); its heat resistance is between that of poly (ether sulfone) and that of poly (biphenyl sulfone ether), and the Tg that indicates its heat resistance grade is freely adjustable between 226° C. and 262° C.

The said high-temperature organic solvent is sulfolane or methylpyrrolidone, and the alkali carbonate used is $Na_2CO_3$, $K_2CO_3$ or a mixture thereof.

BRIEF DESCRIPTION OF THE DRAWINGS

FIG. 1: relation curve between the Tg of the terpolymer and the monomer content of the chain segment component $A'_2$

DETAILED DESCRIPTION OF THE INVENTION

Example 1

Add 434 g of solvent sulfolane to a three-neck flask provided with a thermometer, a nitrogen tube, a condensate water separator and a stirrer, stir and heat to 80° C., add 142.87 g (0.4975 mol, so that the sum of the mole consumptions of 4,4'-dichlorodiphenylsulfone and 4,4'-Bis(4-chlorophenyl)sulfonyl-1,1'-biphenyl is more than that of 4,4'-dihydroxydiphenylsulfone by 0.5%) of 4,4'-dichlorodiphenylsulfone, 2.52 g (0.005 mol) of 4,4'-Bis(4-chlorophenyl)sulfonyl-1,1'-biphenyl and 125.14 g (0.500 mol) of 4,4'-dihydroxydiphenylsulfone in turn, keep stirring until all monomers are dissolved, heat to 100° C., and add 58.3 g (0.550 mol, 10 mol % more than 4,4'-dihydroxydiphenylsulfone) of $Na_2CO_3$ and then 80 ml of xylene to the system. Heat while stirring so that the salt-forming reaction of the system begins, wherein the water generated in the system co-boils with xylene, and cold fluid begins to drip from the condensate tube and stratify in the water separator. The system temperature is controlled between 200° C. and 210° C. When the supernatant xylene turns from turbid to clear, continue to recirculate for 20 minutes to ensure full salt-forming reaction, and then heat to 230-236° C. to start polymerization. Maintain a constant temperature for 3.5 hours to ensure full polymerization. Stop stirring, inject the viscous polymer solution directly into deionized water at room temperature to obtain a strip solid. After filtration, grind the strip solid into powder in a tissue grinder in the presence of water. Add the filtered powder to fresh deionized water and boil away for 1 hour. Repeat this 8-10 times until the chloride ion content in the water as detected with silver nitrate is acceptable.

Vacuum dry the filtered polymer until the moisture content by weight is less than 0.5%. Then a copolymer with a chain segment I to chain segment II ratio of 99%:1% will be obtained.

Its Tg of 226° C. as measured by DSC is equivalent to that of pure poly (ether sulfone) (PES).

Example 2

Add 594 g of sulfolane, 115.59 g (0.4025 mol, 0.5% more) of 4,4'-dichlorodiphenylsulfone, 50.34 g (0.100 mol) of 4,4'-Bis(4-chlorophenyl)sulfonyl-1,1'-biphenyl, 125.14 g (0.500 mol) of 4,4'-dihydroxydiphenylsulfone, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 80%:20% will be obtained.

Its Tg is 237° C. as measured by DSC.

Example 3

Add 645 g of sulfolane, 86.88g (3.025 mol, 0.5% more) of 4,4'-dichlorodiphenylsulfone, 100.68 g (0.200 mol of 4,4'-Bis(4-chlorophenyl)sulfonyl-1,1'-biphenyl, 125.14 g (0.500 mol) of 4,4'-dihydroxydiphenylsulfone, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 60%:40% will be obtained.

Its Tg is 247° C. as measured by DSC.

Example 4

Add 683 g of sulfolane, 58.15 g (0.2025 mill, 0.5% more) of 4,4'-dichlorodiphenylsulfone, 151.02 g (0.300 mol) of 4,4'-Bis(4-chlorophenyl)sulfonyl-1,1'-biphenyl, 125.14 g (0.500 mol) of 4,4'-dihydroxydiphenylsulfone, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 40%:60% will be obtained.

Its Tg is 253° C. as measured by DSC.

Example 5

Add 733 g of sulfolane, 29.43 g (0.1025 mol, 0.5% more) of 4,4'-dichlorodiphenylsulfone, 201.36 g (0.400 mol) of 4,4'-Bis(4-chlorophenyl)sulfonyl-1,1'-biphenyl, 125.14 g (0.500 mol) of 4,4'-dihydroxydiphenylsulfone, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 20%:80% will be obtained.

Its Tg is 258° C. as measured by DSC.

Example 6

Add 809 g of sulfolane, 2.15 g (0.0075 mol, 0.5% more) of 4,4'-dichlorodiphenylsulfone, 249.18 g (0.495 mol) of 4,4'-Bis(4-chlorophenyl)sulfonyl-1,1'-biphenyl, 125.14 g (0.500 mol) of 4,4'-dihydroxydiphenylsulfone, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 60%:40% will be obtained.

Its Tg is 262° C. as measured by DSC, which is the same as that of pure poly (biphenyl sulfone ether).

Draw a curve of the monomer content of the product component $A'_2$ vs. its Tg based on the above results, as shown in FIG. 1.

What is claimed is:
1. A method for preparing terpolymer of poly (biphenyl sulfone ether) and poly (ether sulfone), the steps are as follows:
(1) Adding high-temperature organic solvent to a three-neck flask provided with a thermometer, a nitrogen tube, a condensate water separator and a stirrer, heating to 80° C. and adding 4,4'-dichlorodiphenylsulfone, 4,4'-Bis(4-chlorophenyl)sulfonyl-1,1'-biphenyl and 4,4'-dihydroxydiphenylsulfone with solid content being 20-35%, stirring until all monomers are dissolved, heating to 100° C. and adding alkali carbonate salt-forming agent mol % more than 4,4'-dihydroxydiphenylsulfone by 5-10%, and 60-100 ml of xylene per mole of polymer; heating while stirring so that the salt-forming reaction of the system begins, wherein the system temperature is controlled between 190° C. and 210° C., and the theoretical value achievement of water yield of the system represents the completion of the first-stage salt-forming reaction; at the moment, raising the system temperature to

230-236° C. and maintaining for 3-4 hours to complete polymerization to obtain a viscous polymer solution;

(2) After the reaction stops, injecting the viscous polymer solution directly into distilled water at room temperature to obtain a strip solid; grinding the strip solid into powder in a tissue grinder in the presence of water to obtain a solid powder containing a polymer, water-soluble solvent and salt through filtration; adding the solid powder to deionized water, boiling away for 1 hour, and removing the water-soluble solvent and salt through filtration; then boiling away the polymer-containing solid powder in the same way 8-10 times until the chloride ion content in the boiling filtrate as detected with silver nitrate is acceptable; vacuum drying the resultant polymer powder until the moisture content by weight is less than 0.5%, when a terpolymer containing chain segments I and II is obtained,

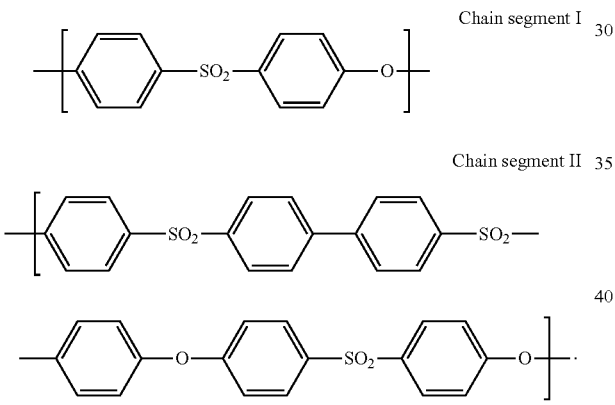

Chain segment I

Chain segment II

2. A method for preparing terpolymer of poly (biphenyl sulfone ether) and poly (ether sulfone) according to claim 1, wherein when the mole consumption ratio of 4,4'-dichlorodiphenylsulfone to 4,4'-Bis(4-chlorophenyl)sulfonyl-1,1'-biphenyl is $\geq$99%:1%, the content of segment chain I is $\geq$99% and that of segment chain II$\leq$1% in the resultant terpolymer, and the macroscopic physical properties of the terpolymer are the same as those of the corresponding poly (ether sulfone) (PES), where the mole consumption of 4,4'-dihydroxydiphenylsulfone is the sum of the mole numbers of 4,4'-dichlorodiphenylsulfone and 4,4'-Bis(4-chlorophenyl)sulfonyl-1,1'-biphenyl

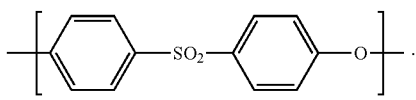

(PES)

3. A method for preparing terpolymer of poly (biphenyl sulfone ether) and poly (ether sulfone) according to claim 1, wherein when the mole consumption ratio of 4,4'-dichlorodiphenylsulfone to 4,4'-Bis(4-chlorophenyl)sulfonyl-1,1'-biphenyl is $\leq$1%:99%, the content of chain segment I is $\leq$1% and that of chain segment II$\geq$1% in the resultant terpolymer, and the macroscopic physical properties of the terpolymer are equivalent to those of the poly (biphenyl sulfone ether) shown below, where the mole consumption of 4,4'-dihydroxydiphenylsulfone is the sum of the mole numbers of 4,4'-dichlorodiphenylsulfone and 4,4'-Bis(4-chlorophenyl)sulfonyl-1,1'-biphenyl,

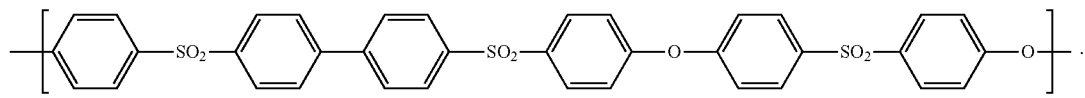

4. A method for preparing terpolymer of poly (biphenyl sulfone ether) and poly (ether sulfone) according to claim 1, wherein when the sum of the consumptions of 4,4'-dichlorodiphenylsulfone and 4,4'-Bis(4-chlorophenyl)sulfonyl-1,1'-biphenyl is more than that of 4,4'-dihydroxydiphenylsulfone, a chlorine end group with the following structure may be obtained:

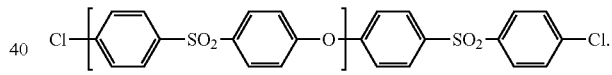

5. A method for preparing terpolymer of poly (biphenyl sulfone ether) and poly (ether sulfone) according to claim 1, wherein when 4,4'-dihydroxydiphenylsulfone is more than the sum of the consumptions of 4,4'-dichlorodiphenylsulfone and 4,4'-Bis(4-chlorophenyl)sulfonyl-1,1'-biphenyl, a hydroxyl end group with the following structure may be obtained:

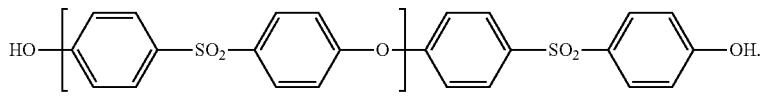

6. A method for preparing terpolymer of poly (biphenyl sulfone ether) and poly (ether sulfone) according to claim 1, wherein a terpolymer with a different ratio of chain segment I to chain segment II in the molecular chain, and a different structural composition can be obtained by changing the mixing ratio of 4,4'-dichlorodiphenylsulfone to 4,4'-Bis(4-chlorophenyl)sulfonyl-1,1'-biphenyl; its heat resistance is between that of poly (ether sulfone) and that of poly (biphenyl sulfone ether), and its Tg is within 226-262° C.

7. A method for preparing terpolymer of poly (biphenyl sulfone ether) and poly (ether sulfone) according to claim 1, wherein the high-temperature organic solvent is sulfolane or methylpyrrolidone.

8. A method for preparing terpolymer of poly (biphenyl sulfone ether) and poly (ether sulfone) according to claim 1, wherein the alkali carbonate is $Na_2CO_3$, $K_2CO_3$ or a mixture thereof.

* * * * *